United States Patent
Harms et al.

(10) Patent No.: US 7,138,054 B2
(45) Date of Patent: Nov. 21, 2006

(54) CARTRIDGE FILTER SYSTEM

(75) Inventors: Harold H. Harms, Palm Beach Gardens, FL (US); Eric D. Seville, Hobe Sound, FL (US)

(73) Assignee: Harmsco, Inc., North Palm Beach, FL (US)

( * ) Notice: Subject to any disclaimer, the term of this patent is extended or adjusted under 35 U.S.C. 154(b) by 216 days.

(21) Appl. No.: 10/839,185

(22) Filed: May 5, 2004

(65) Prior Publication Data

US 2005/0247617 A1    Nov. 10, 2005

(51) Int. Cl.
*C02F 9/12* (2006.01)
*B01D 27/08* (2006.01)

(52) U.S. Cl. ............. 210/232; 210/209; 210/261; 210/262; 210/440; 210/443; 210/450; 210/748

(58) Field of Classification Search ............. 210/232, 210/440, 443, 748, 209, 261, 262, 450
See application file for complete search history.

(56) References Cited

U.S. PATENT DOCUMENTS

| | | | |
|---|---|---|---|
| 2,076,936 A * | 4/1937 | Burckhalter | 210/323.1 |
| 2,218,339 A * | 10/1940 | Manning | 210/233 |
| 2,354,481 A * | 7/1944 | Russell | 210/494.1 |
| 2,709,524 A * | 5/1955 | Boggs et al. | 210/238 |
| 2,736,435 A * | 2/1956 | Gardes et al. | 210/282 |
| 3,348,695 A * | 10/1967 | Rosaen | 210/489 |
| 3,415,382 A * | 12/1968 | Martin | 210/282 |
| 3,442,390 A * | 5/1969 | Barmore et al. | 210/323.2 |
| 3,551,091 A | 12/1970 | Veloz | |
| 3,720,322 A | 3/1973 | Harms | |
| 3,950,251 A | 4/1976 | Hiller | |
| 4,091,265 A * | 5/1978 | Richards et al. | 219/501 |
| 4,094,791 A * | 6/1978 | Conrad | 210/316 |
| 4,101,777 A | 7/1978 | Reid | |
| 4,187,179 A | 2/1980 | Harms | |
| 4,561,979 A | 12/1985 | Harms et al. | |
| 4,579,657 A * | 4/1986 | Hood, Jr. | 210/314 |
| 4,615,799 A | 10/1986 | Mortensen | |
| 4,647,373 A * | 3/1987 | Tokar et al. | 210/232 |
| 4,694,179 A | 9/1987 | Lew et al. | |
| 4,751,901 A * | 6/1988 | Moor | 123/196 A |
| 4,902,411 A | 2/1990 | Lin | |
| 5,004,541 A | 4/1991 | Noll et al. | |
| 5,069,782 A | 12/1991 | Moyher, Jr. et al. | |
| 5,078,876 A | 1/1992 | Whittier et al. | |
| 5,196,119 A | 3/1993 | Harms et al. | |
| 5,227,053 A | 7/1993 | Brym | |
| 5,266,215 A | 11/1993 | Engelhard | |
| 5,316,677 A | 5/1994 | Harms, II | |
| 5,368,069 A | 11/1994 | Felber | |
| 5,529,689 A * | 6/1996 | Korin | 210/232 |
| 5,597,482 A * | 1/1997 | Melyon | 210/209 |

(Continued)

*Primary Examiner*—Thomas M. Lithgow
(74) *Attorney, Agent, or Firm*—Akerman Senterfitt; J. Rodman Steele, Jr.; Michael K. Dixon

(57) ABSTRACT

A fluid filter system including a cartridge filter housed in a tank having a standpipe extending from a bottom surface of the tank. The cartridge filter is positioned in the tank with the standpipe extending into an outlet tube in the filter. Fluids flow into the tank, through the filter, and out through the standpipe. The cartridge filter may include a seal in an upper portion of the filter for sealing the cartridge filter to the standpipe in a position that is above the contaminant laden fluids and debris that collect at the bottom of a tank during removal of a cartridge filter.

22 Claims, 5 Drawing Sheets

U.S. PATENT DOCUMENTS

| | | |
|---|---|---|
| 5,782,499 A | 7/1998 | Gfrerer et al. |
| 5,843,309 A * | 12/1998 | Mancil .................... 210/205 |
| 5,858,232 A | 1/1999 | Meissner |
| 6,576,129 B1 | 6/2003 | Reid |

* cited by examiner

CARTRIDGE FILTER SYSTEM

FIELD OF THE INVENTION

This invention is directed generally to fluid filters, and more particularly to fluid filters having replaceable filters.

BACKGROUND

There exists numerous conventional fluid filters for removing contaminants, such as shown in U.S. Pat. Nos. 3,720,322 and 4,187,179. One particular style of fluid filter, such as those used in drinking water and pool cleaning systems, includes a generally cylindrical tank housing a removable cartridge filter, as shown in U.S. Pat. Nos. 4,561,979 and 5,316,677. The cartridge filter is formed from a filter media positioned between bottom and top plates. Fluids are filtered by passing the fluids into the tank, passing the fluids through the filter media, and expelling the filtered fluids through an outlet tube in the cartridge filter. Typically, the tanks include standpipes generally along longitudinal axes of the tanks. The standpipes prevent contaminant laden fluid from passing into the downstream portion of the systems containing the filtered fluids. Instead, the standpipes cause the contaminant laden fluids to collect in the filter media and surrounding space in the tanks.

Typically, cartridge filters include seals in bottom portions of the filter to seal the cartridge filter to the standpipe. In this arrangement, the cartridge filter is sealed proximate to a bottom floor of the tank. After a filter system having this configuration is operated, the cartridge filter may be removed to be serviced, cleaned, or replaced by first removing a cover from the top of the tank. Typically, the cover is maintained in contact with the cartridge filter during operation to keep the filter sealed to the standpipe. Once the cover has been removed, the filter may be withdrawn. Withdrawing the cartridge filter leaves contaminant laden fluid together with all the debris filtered from fluid in the tank and in contact with the standpipe at the point where the cartridge filter is sealed to the standpipe. To insure that a seal is made between the outlet tube of the cartridge filter and the standpipe when the cartridge filter is reinstalled, the containment laden fluid and debris must be removed from the tank. In addition, the outer surface of the standpipe must be cleaned by a service personnel reaching into the tank and wiping the standpipe. Many times, accessing the lower portions of the standpipe can be very difficult and time consuming. Thus, a need exists for a fluid filter system having a more efficient system for replacing cartridge filters.

SUMMARY OF THE INVENTION

This invention relates to a filter system for removing contaminants from a contaminant laden fluid and for reducing the amount of time necessary to perform cleaning operations to remove and replace a cartridge filter. The filter system includes a tank having an opening for receiving a cartridge, a cover attached to the tank to seal the opening, and a standpipe extending from a bottom surface of the tank towards the cover. The filter system also includes a cartridge filter configured to fit in the tank. The cartridge filter may include filter media between bottom and top surfaces of the filter and an outlet tube extending from the bottom surface toward the top surface. The cartridge filter may also include at least one seal positioned in the outlet tube in closer proximity to the top surface than to the bottom surface of the filter and in contact with the standpipe. The seal forms a seal between the outlet tube of the cartridge filter and the standpipe enabling filtered fluid to be passed through the standpipe and eventually out of the filter system without contacting the contaminant laden fluid.

The seal positioned in the cartridge filter enables the cartridge filter to be attached to the standpipe and to form a seal with the standpipe proximate to the top of the tank. By sealing the standpipe to the cartridge filter above the bottom surface of the tank, the portion of the standpipe to which the seal contacts is not contacted by contaminant laden fluid when a cartridge filter is removed from the tank. Thus, this configuration advantageously eliminates the need to remove contaminated water contained in the tank once the cartridge filter has been removed and the need to clean the outside surface of the standpipe. In the rare event that the standpipe needs to be cleaned, the portion of the standpipe to which the seal in the cartridge filter contacts to form a seal is proximate to the top of the tank where it is easily accessible and does not require someone to reach into the bottom portions of the tank to clean the standpipe. These and other embodiments and advantages are described below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
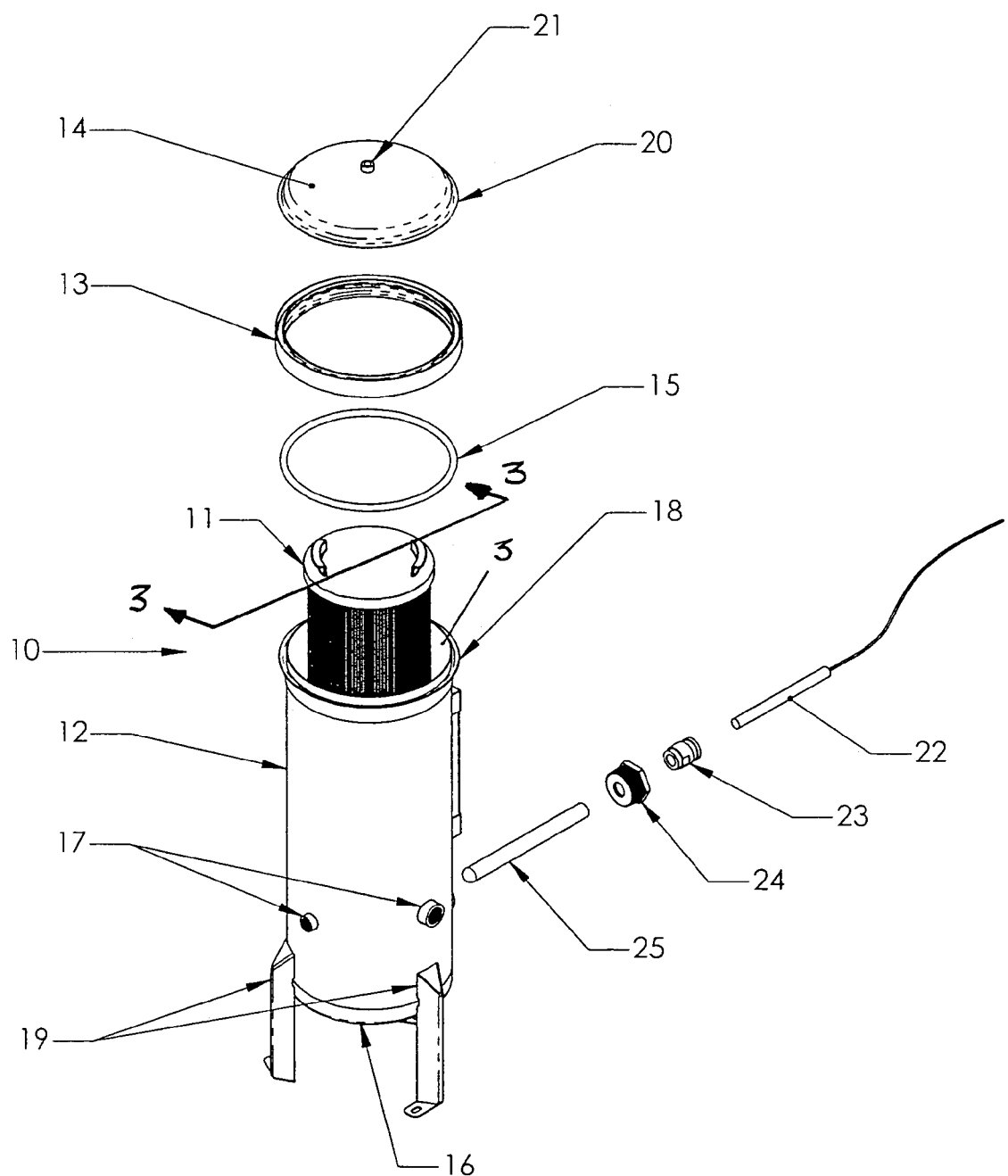
FIG. 1 is an exploded perspective view of a filter system having aspects of this invention.

As shown in FIGS. 1–8, this invention is directed to a filter system 10 having a cartridge filter 11 with an improved sealing mechanism 2 for sealing the cartridge filter 11 to a standpipe 39 of a standpipe assembly 35. The sealing mechanism 2 may be located proximate to a cover 14 of the filter system 10 so that the portion of the standpipe 39 that contacts the seal assembly 2 is not in contact with contaminant laden fluid when the cartridge filter 11 is removed from the filter system 10. The filter system 10 enables a cartridge filter 11 to be removed and reinstalled from the filter system 10 more easily and in less time than conventional cartridge filters.

Figure 2:
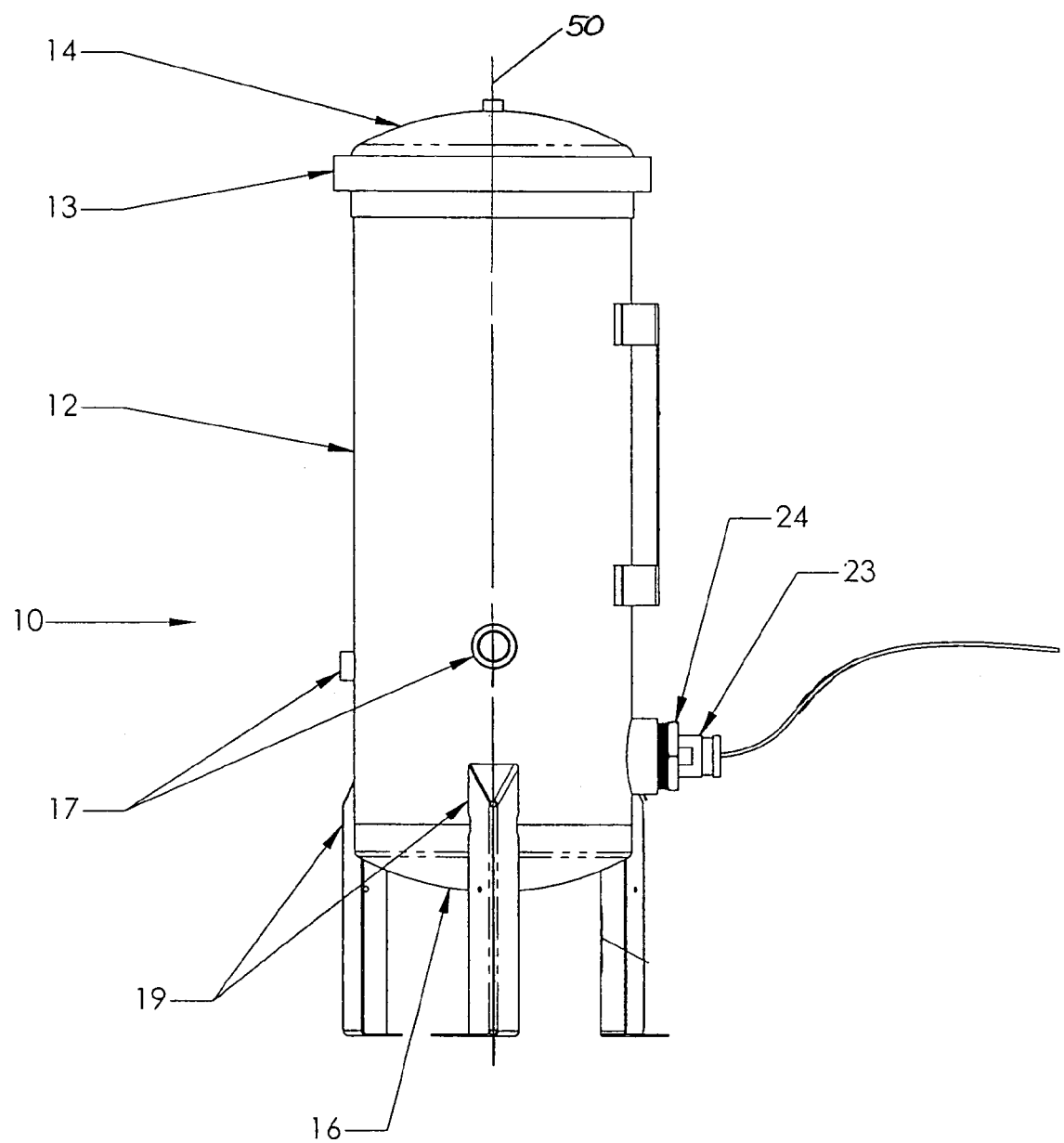
FIG. 2 is an assembled front view of the filter system shown in FIG. 1.
Figure 3:
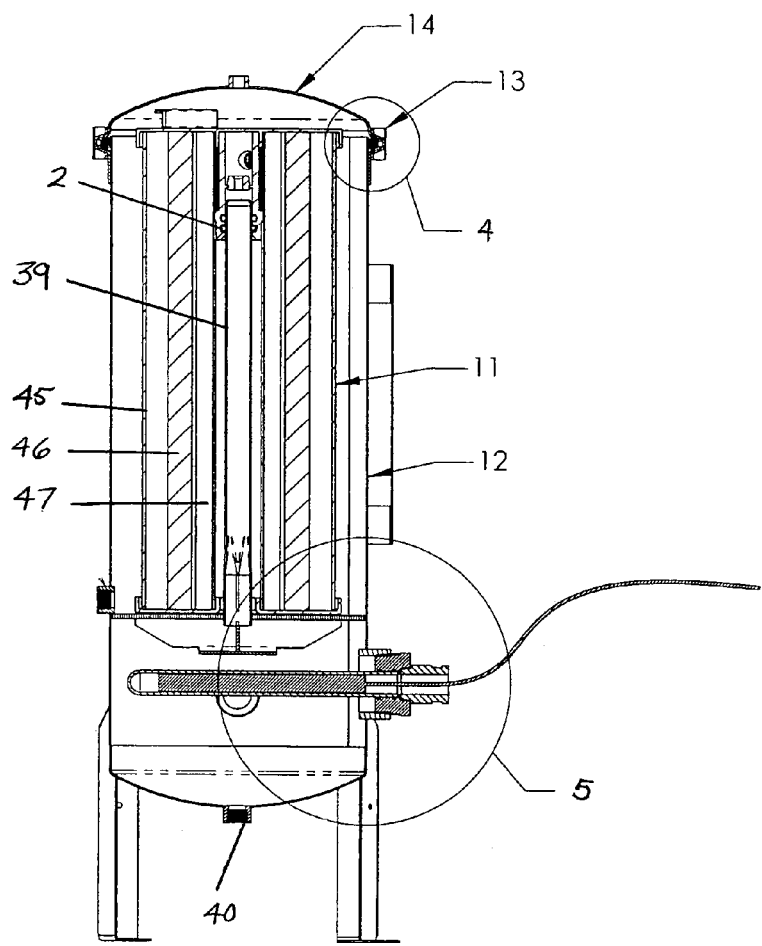
FIG. 3 is a cross-sectional view taken along section line 3—3 in FIG. 1.
Figure 4:
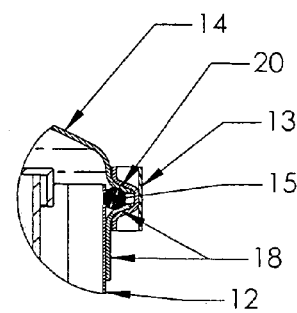
FIG. 4 is a detailed cross-sectional view of detail 4 shown in FIG. 3.

As shown in FIG. 1, the filter system 10 includes a generally hollow tank 12 having an opening 3 for receiving a cartridge filter 11. A cover 14 may seal the opening 3, and, as shown in FIG. 2, may be releasably attached to the tank 12 using any releasable mechanism, such as clamp band 13. The cover 14 may include a flange 20 that forms a seal with opposing sealing flange 18 on the tank 12 and a seal 15, which may be an o-ring seal, positioned between the flanges 18, 20, as shown in FIG. 4. The cover 14 may include one or more ports 21, as shown in FIG. 1, for use with condition detection devices, such as, but not limited to, a pressure relief valve, a pressure gauge, or other appropriate device. When the cover 14 is attached to the tank 12, as shown in FIG. 3, the cover 14 need not contact the cartridge filter 11 to keep the cartridge filter 11 in place. Instead, the internal portions of the tank 12 are pressurized during operation, which keeps the cartridge filter 11 in place and the sealing mechanism 2 secure. A continuous gap may exist between a top surface 41 of the cartridge filter 11 and the cover 14.

Figure 5:
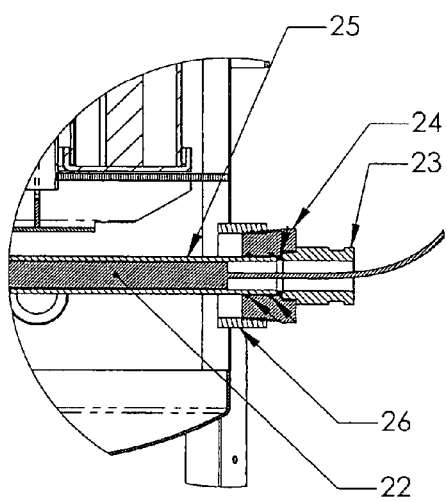
FIG. 5 is a detailed cross-sectional view of detail 5 shown in FIG. 3.
Figures 6, 7:
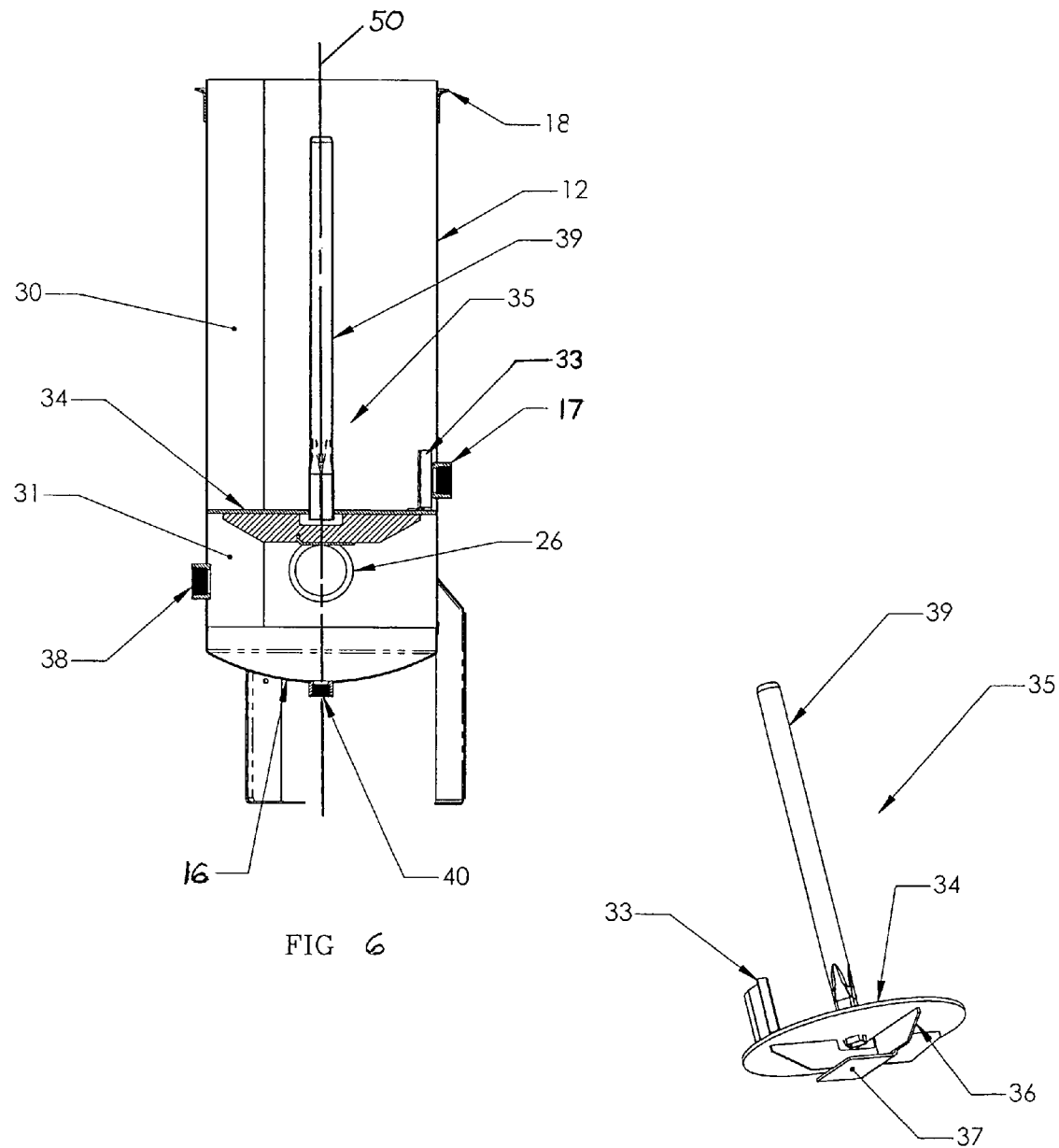
FIG. 6 is a partial cross-sectional view taken along section line 3—3 in FIG. 1 with the cartridge filter removed.
FIG. 7 is a perspective view of a standpipe assembly of the filter system.

As shown in FIG. 1, the tank 12 may include a base 16 and may also be generally cylindrical, or other appropriate shape. In at least one embodiment, the tank 12 may be supported and electrically grounded by legs 19. The tank 12 may be divided into two regions, a cartridge receiving region 30, and a ultraviolet (UV) treatment region 31, as shown in FIG. 6. The UV treatment region 31 includes a UV lamp 22 for imparting UV light to fluids flowing through the filter system 10 to kill living organisms that may be found in the fluids, as shown in FIG. 1. The UV lamp 22 may be removably coupled to the tank 12 by inserting the UV lamp 22 through a coupling 26 and into a sleeve 25, which may be a quartz sleeve, as shown in FIG. 5. The UV lamp 22 may be further held in position using a hex reducer bushing 24 and a UV adapter 23 to prevent the sleeve 25 from moving due to internal pressure in the tank 12. The adapter 23 holds the sleeve 25 in place and enables the UV lamp 22 to be easily inserted into the sleeve 25. The UV treatment region 31 may be strengthened with a rib 36, and may include a baffle 37 for directing flow away from outlet port 40 to assure maximum residence time of fluid in the UV treatment region 31, as shown in FIG. 7.

The cartridge receiving region 30 includes at least one inlet 17 for receiving unprocessed fluids and may include a standpipe assembly with a standpipe 39, otherwise referred to as an outlet tube 43. A baffle 33, as shown in FIGS. 6 and 7, may be positioned proximate to the inlet 17 for diverting the incoming fluid. The standpipe 39 may extend from a bottom surface 34 of the cartridge receiving region 30, as shown in FIG. 6. In at least one embodiment, the standpipe 39 is positioned at the center of the cartridge receiving region 30 and extends generally along a longitudinal axis 50 of the tank 12 to a point in close proximity with the cover 14. The standpipe 39 provides a fluid flow pathway between the cartridge receiving region 30 and the UV treatment region 31. An outlet 40, as shown in FIGS. 3 and 6, is located in the UV treatment region 31 enabling treated fluid to be expelled from the filter system 10.

Figure 8:
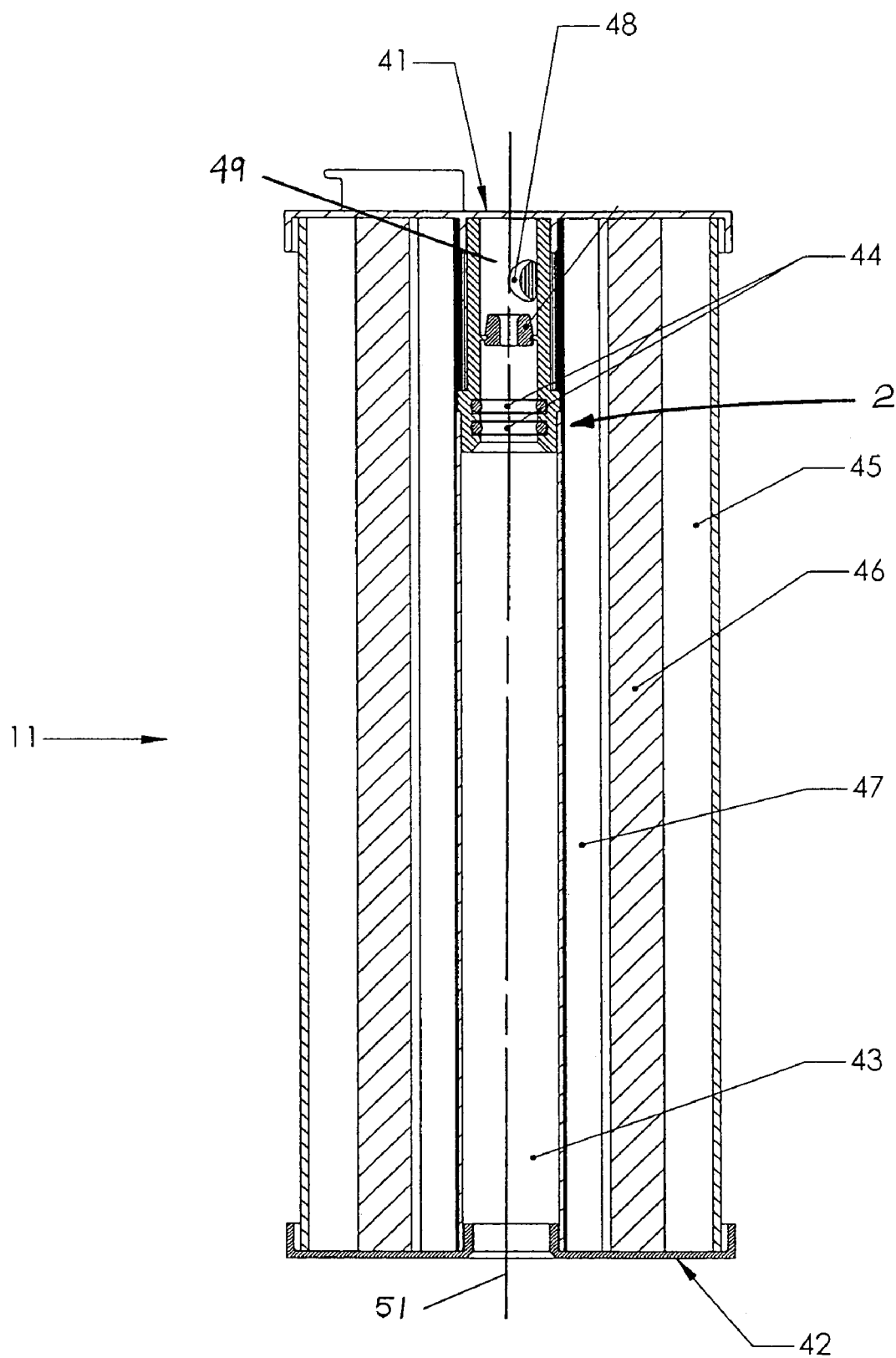
FIG. 8 is a cross-sectional view of a cartridge filter taken along section line 3—3 in FIG. 1.

As shown in FIGS. 3 and 8, the filter system 10 may also include a cartridge filter 11 configured to fit into the tank 12. The cartridge filter 11 may include an outlet tube 43 adapted to be sealed to the standpipe 39 at a point proximate to the standpipe 39 using sealing mechanism 2. The cartridge filter 11 may include a top 41, a bottom 42, and at least one layer of filter media 45 positioned between the top 41 and the bottom 42. The filter media 45 may be attached to the top 41 and the bottom 42 with an adhesive (not shown), such as a potting adhesive. In at least one embodiment, the cartridge filter 11 may include three layers of filter media, 45, 46, and 47 as shown in FIG. 8, positioned concentrically around the outlet tube 43 and forming a generally cylindrical filter. In at least one embodiment, the outlet tube 43 may be referred to as a central core and positioned along a longitudinal axis 51 of the cartridge filter 11.

A sealing mechanism 2 may be positioned in the cartridge filter 11 for sealing the central core to the standpipe 39. The sealing mechanism 2 may be in closer proximity to the top 41 than to the bottom 42, such as between a midpoint of the standpipe 39 and an open end of the standpipe 39 at the top of the tank 12. In at least one embodiment, the sealing mechanism 2 may be positioned in close proximity to the top 41, as shown in FIG. 8. The sealing mechanism 2 may include one or more seals 44, such as, but not limited to, o-rings or other appropriate seals. In at least one embodiment, as shown in FIGS. 3 and 8, the sealing mechanism 2 may be formed from two o-rings 44. The seals 44 may be positioned in one or more recesses in the side wall forming the outlet tube 43. A fluid collection tube 49 may be positioned between the top 41 and the central core 43 for directing the flow of water into the central core 43. In at least one embodiment, as shown in FIG. 3, the fluid collection tube 49 includes a plurality of holes 48 having cross-sectional areas that are larger than cross-sectional areas of the central core.

During use, a cartridge filter 11 may be inserted through the opening 3 into the tank 12. As the cartridge filter 11 is inserted into the tank 12, the standpipe 39 may be directed to be inserted into the outlet tube 43. The standpipe 39 contacts the sealing mechanism 2 and forms a seal between the standpipe 39 and the cartridge filter 11. The cover 14 may then be installed by placing the cover 14 on the opening 3 in the tank 12. As the cover 14 is installed, the cover 14 need not make contact with the cartridge filter 11 to keep the cartridge filter 11 in place during operation. The clamp band 13 may be installed around the cover 14 and tightened to secure the cover 14 to the tank 12.

Fluids having various contaminants may be circulated through the filter system 10 by first entering the inlet 17 and flowing through the filter media 45. Contaminants are removed by the filter media 45 as the fluid flows through the filter media 45. The fluids travel through the filter media 45 to the fluid collection tube 49. The fluids pass through the openings in the fluid collection tube 49 and flow into standpipe 39. The fluids then flow down through the standpipe 39 and may be discharged from the filter system 10 in some embodiments or, in other embodiments, may be expelled into the UV treatment region 31. Fluids discharged into the UV treatment region 31 may be subjected to UV light to further sterilize remaining living organisms that may be contained in the fluid.

After time, the cartridge filter 11 may need to be removed to be cleaned or replaced. The cartridge filter 11 may be removed by relieving the pressure on the filter system 10 and removing the cover 14. Once, the cover 14 has been removed, the cartridge filter 11 may be pulled from the tank 12. As the cartridge filter 11 is pulled from the tank 12, the contaminant laden fluids collect in the bottom of the tank 12; however, the fluids are not in contact with the portion of the standpipe 39 to which the sealing mechanism 2 of the cartridge filter 11 contacts and forms a seal. Thus, the standpipe 39 need not be cleaned when a new cartridge filter 11 or a previously used cartridge filter 11 is inserted into the tank 12. Rather, the cartridge filter 11 may be placed into the tank 12 and the sealing mechanism 2 may form a seal without requiring any maintenance performed on the standpipe 39. The cover 14 may be installed on the top of the tank 12 and the filter system 10 may be operated once again.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A cartridge filter, comprising:
    at least one filter media having a bottom surface and a top surface generally opposite the bottom surface;
    an outlet tube extending from the bottom surface into the filter toward the top surface; and
    at least one seal positioned in the outlet tube in closer proximity to the top surface than to the bottom surface for sealing the outlet tube to a standpipe of a fluid filter tank wherein the standpipe is coupled to the outlet tube by the at least one seal; and
    a fluid collection tube that is located between the top surface and the seal for collecting fluids having passed through the at least one filter media,
    wherein the fluid collection tube includes at least one aperture for receiving fluids having passed through the at least one filter media, and wherein the at least one aperture has a cross-sectional area that is greater than a cross-sectional area of a diameter of the standpipe.

2. The cartridge filter of claim 1, wherein the at least one seal comprises at least one o-ring coupled to the outlet tube.

3. The cartridge filter of claim 2, wherein the at least one o-ring is positioned in a recess in a surface of the outlet tube.

4. The cartridge filter of claim 2, wherein the at least one o-ring comprises two o-rings.

5. The cartridge filter of claim 1, wherein the at least one filter media is generally cylindrical and formed from at least three types of material.

6. The cartridge filter of claim 5, wherein the at least one filter media is formed from at least three concentric filter media.

7. A fluid filter system, comprising:
    a tank having an opening for receiving a cartridge filter;
    a cover that is configured to attach to the tank sealing the opening; p1 a standpipe extending from a bottom surface of the tank toward the cover; and
    a cartridge filter contained in an inner cavity of the tank, comprising:
        at least one filter media having a bottom surface and a top surface generally opposite the bottom surface;
        an outlet tube extending from the bottom surface into the filter toward the top surface; and
        at least one seal that is positioned in the outlet tube in closer proximity to the top surface than to the bottom surface and in contact with the standpipe of a fluid filter tank; and
        a fluid collection tube between the top surface and the seal for collecting fluids having passed through the at least one filter media.
    wherein the fluid collection tube includes at least one aperture for receiving fluids having passed through the at least one filter media, wherein the at least one aperture has a cross-sectional area that is greater than a cross-sectional area a diameter of the standpipe.

8. The fluid filter system of claim 7, wherein the at least one seal comprises at least one o-ring coupled to the outlet tube.

9. The fluid filter system of claim 8, wherein the at least one o-ring is positioned in a recess in a surface of the outlet tube.

10. The fluid filter system of claim 8, wherein the at least one o-ring comprises two o-rings.

11. The fluid filter system of claim 7, wherein the at least one filter media is generally cylindrical and formed from at least three types of material.

12. The fluid filter system of claim 11, wherein the at least one filter media is formed from at least three concentric filter media.

13. The fluid filter system of claim 7, wherein a continuous gap exists between an inside cover of the cover and the top surface of the cartridge filter.

14. The fluid filter system of claim 7, wherein the tank comprises a cartridge receiving region containing at least one cartridge filter and an ultraviolet treatment region having at least one ultraviolet light source for exposing filtered fluids to ultraviolet light.

15. The fluid filter system of claim 14, further comprising at least one baffle positioned proximate to an inlet of the system and at least one baffle positioned proximate to an outlet of the system.

16. A cartridge filter that is configured to be inserted into a fluid tank, having a top comprising:
    a core that is positioned along a longitudinal axis of the cartridge filter, the core extending from a bottom surface of the cartridge filter toward a top surface of the cartridge filter, wherein the core receives a standpipe that is located within the fluid tank;
    at least one filter media that is positioned between the bottom surface and the top surface of the cartridge filter, wherein the at least one filter media is positioned around the core; and
    at least one seal that is positioned between the core and the standpipe at a location between a midpoint of the standpipe and an open end of the standpipe,
    wherein the at least one seal is proximate to the top of the fluid tank,
    wherein an upper portion of the core, located above an uppermost of the at least one seal, is configured to permit fluid that has passed through the at least one filter media to be fluidly coupled to an inner portion the standpipe, and
    wherein the entire portion of the core, located below a lowermost of the at least one seal, is not configured to fluidly couple to the inner portion of the standpipe.

17. The cartridge filter of claim 16, wherein the core further comprises a fluid collection tube that is located between the top surface of the cartridge filter and the seal for collecting fluids that have passed through the at least one filter media.

18. The cartridge filter of claim 17, wherein the fluid collection tube includes at least one aperture for receiving fluids that have passed through the at least one filter media, wherein the at least one aperture has a cross-sectional area that is greater than a cross-sectional area of a diameter of the standpipe.

19. A fluid filter system, comprising:
    a tank having an opening for receiving a cartridge filter;
    a cover that is configured to attach to the opening of the tank;
    a standpipe located within the tank and extending from a bottom surface of the tank toward the opening of the tank; and
    a cartridge filter that is configured to be inserted into the tank, comprising:
        a core that is positioned along a longitudinal axis of the cartridge filter, the core extending from a bottom surface of the cartridge filter toward a top surface of the filter cartridge, wherein the core is received the standpipe;
        at least one filter media that is positioned between the bottom surface and the top surface of the the cartridge filter, wherein the at least one filter media is positioned around the core; and at least one seal that is positioned between the core and the standpipe at a location between a midpoint of the standpipe and an open end of the standpipe, wherein the at least one seal is proximate to the opening of the tank, wherein an upper portion of the core, located above an uppermost of the at least one seal, is configured to permit fluid that has passed through the at least one filter media to be fluidly coupled to an inner portion the standpipe, and wherein the entire portion of the core, located below a lowermost of the at least one seal, is not configured to fluidly couple to the inner portion of the standpipe.

20. The fluid filter system of claim 19, wherein said core further comprises a fluid collection tube that is located between the top surface of the cartridge filter and the sea for collecting fluids that have passed through the at least one filter media.

21. The fluid filter system of claim 20, wherein the fluid collection tube includes at least one aperture for receiving fluids that have passed through the at least one filter media, wherein the at least one aperture has a cross-sectional area that is greater than a cross-sectional area of the core.

22. The fluid filter system of claim 21, wherein the tank comprises a cartridge receiving region containing at least one cartridge filter and an ultraviolet treatment region having at least one ultraviolet light source for exposing filtered fluids to ultraviolet light.

* * * * *

UNITED STATES PATENT AND TRADEMARK OFFICE
CERTIFICATE OF CORRECTION

| | | |
|---|---|---|
| PATENT NO. | : 7,138,054 B2 | Page 1 of 1 |
| APPLICATION NO. | : 10/839185 | |
| DATED | : November 21, 2006 | |
| INVENTOR(S) | : Harold H. Harms et al. | |

It is certified that error appears in the above-identified patent and that said Letters Patent is hereby corrected as shown below:

In the claims:

Claim 7, column 5, line 37, after "opening;" delete "p1".
Claim 7, column 5, line 56, after "area" add --of--.
Claim 19, column 6, line 64, after "core" replace "is received" with --receives--.

Signed and Sealed this

Tenth Day of April, 2007

JON W. DUDAS
*Director of the United States Patent and Trademark Office*